July 21, 1953 R. FUTTERKNECHT 2,646,516
IONIZATION RESPONSIVE INSTRUMENT
Filed Aug. 13, 1951
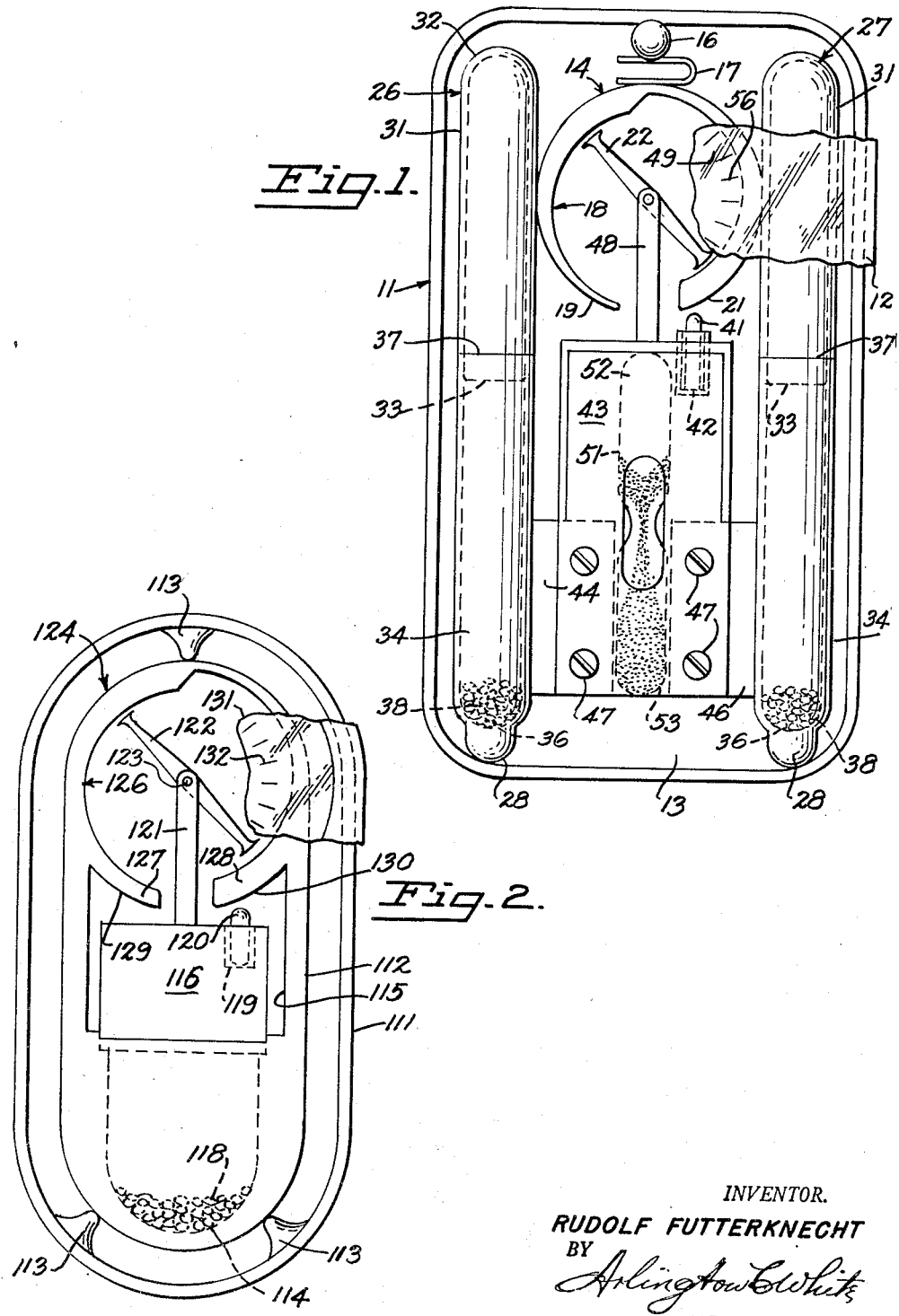
INVENTOR.
RUDOLF FUTTERKNECHT
BY
Arlington White
ATTORNEY Patented July 21, 1953

2,646,516

UNITED STATES PATENT OFFICE 2,646,516

IONIZATION RESPONSIVE INSTRUMENT

Rudolf Futterknecht, Stuttgart, Germany, assignor to Nassau Distributing Co., Inc., New York, N. Y., a corporation of New York Application August 13, 1951, Serial No. 241,620
In Germany August 25, 1950

20 Claims. (Cl. 250—83.6)

The invention, in general, relates to devices for testing the ionizing effects of ambient space and more particularly relates to an instrument for quickly and reliably detecting and ascertaining the concentration of radioactive radiation.

As is perhaps known, there have been developed heretofore various appliances for ascertaining radioactive radiations but these prior devices, in general, require special skill in using and, in the main, are of somewhat cumbersome construction, are of somewhat complex operation, and have the inherent disadvantage of depending upon friction means to accomplish their purposes. The present invention obviates all difficulties militating against simplicity and effectiveness of operation inherent in prior devices, and is directed to an inexpensively produced instrument of simple operation which can be used efficaciously by the unskilled, such as children, as efficiently as by any skilled operator.

A primary object of my present invention is to provide an improved ionization-responsive instrument affording rapid and accurate valuations of concentrations of radioactive radiations in ambient space.

Another important object of the invention is to provide an improved instrument of the indicated nature which is additionally characterized by its capability of affording repeat measurements of intensity of radioactive radiations at the shortest intervals.

A still further object of my invention is to provide an improved instrument of the aforementioned character which is durable, rugged, and yet of such simple construction and compactness as to permit the instrument conveniently to be carried about in a vest pocket or similar small space.

Other objects of the invention, together with some of the advantageous features thereof, will appear from the following description of a preferred embodiment as well as a modified embodiment of the present invention which are illustrated in the accompanying drawing. It is to be understood, however, that I am not to be limited to the precise embodiments shown, nor to the precise arrangement of the various parts thereof, as my invention, as defined in the appended claims, can be embodied in a plurality and variety of forms.

Referring to the drawing:

Fig. 1 is a plan view, with a portion of the cover removed to show the construction, of a preferred embodiment of the invention.

Fig. 2 is a view similar to Fig. 1 of a modified embodiment of the invention.

In its preferred form, the ionization responsive instrument of my present invention preferably comprises a hermetically sealed casing, an indicating device such as an electroscope or electrometer supported in said casing and including a pivotally mounted pointer, a first means movable within said casing to a charging position for producing a first potential of a given value on said indicating device as well as movable to a non-charging position to permit discharge of said device, together with a second means movable within said casing in unison with said first means for effecting a displacement of said charge upon withdrawal of said first means from its charging to its non-charging position, the displacement of said charge being reflected by the deflection of said pointer from an initial position to a second position indicating a second potential between the electrodes of said indicating device different from said first potential; said device discharging in the absence of ionizing effects at a given rate as reflected by the movement of said pointer from its second position towards its initial position and discharging at a different rate when the instrument is exposed to the ionizing effects of radioactive radiation present in the surrounding ambient space, and passing through the casing to effect ionization of the enclosed air.

As particularly illustrated in Fig. 1 of the annexed drawing I provide in the preferred embodiment of the present invention a casing generally designated by the reference numeral 11 and consisting of a pair of complementary shells 12 and 13 which are hermetically sealed together at their meeting edges by any suitable means, such as by welding the shells to each other at the juncture. Preferably, the casing is fabricated from a urea or phenol condensate or other plastic material, with a transparent outer surface on the upper shell 12 of the casing, although the entire casing 11 can be made of a transparent material, if desired, with a coating of lacquer thereover except in areas constituting windows, as hereinafter described, for viewing the parts within the casing.

In accordance with my invention, an electrometer 14 is fixedly secured within casing 11 by disposing the same on bottom shell 13 adjacent to one end and centrally thereof. Any suitable means can be employed to secure the electrometer in position, such as by welding a body 16 to the inside of the shell 13 and interposing a hair-pin spring 17 between the body 16 and the electrometer with one leg of the hair-pin spring welded to the body 16 and the other leg of the spring welded to the electrometer. While any conventional electroscope or electrometer of two opposed charge carriers or electrodes may be used, I preferably provide in the electrometer 14 an outer annular charged carrier or electrode 18 which is formed of two eccentrically shaped segments 19 and 21. A two-armed pointer 22, representing an inner electrode and having its outer extremities formed in the shape of pole pieces, is included in the electrometer and is pivotally mounted as hereinafter described with its pivot axis at the center of the annular outer electrode 18 so that the pointer rotates within the annular electrode between the segments 19 and 21 thereof.

To the end that the electrometer 14 may be rapidly charged, and as rapidly placed in condition to permit discharge thereof, there are also provided within casing 11 at opposite sides of the shell 13 a pair of sectional tubular structures 26 and 27 extending substantilaly from end to end of shell 13. If desired, the shell 13 may be formed with cavities for seating the tubular structures 26 and 27, and to prevent dislodgment thereof each of the structures may be welded to a member 28 at one end thereof and the member 28, in turn, welded to the shell. Each of the tubular structures 26 and 27 consists of a section 31 of electrically conductive material, such as metal, which is closed at one end, as at 32, and open at the other end, as at 33, as well as of a section 34 of electrical non-conductive material, such as a plastic, which similarly is closed at one end, as at 36, and open at the other end, as at 37. The two sections 31 and 34 of each tubular structure are preferably telescopically fitted together at their open ends to afford relatively long unitary tubes extending within and along each side of the casing, with the metal sections 31 of the tubular structures in contact with the segments 19 and 21 of the annular outer electrode 18 of the electroscope, as shown. Within each of the tubular structures 26 and 27, I loosely dispose a plurality of relatively small particles of electrical insulation material, such as a plurality of glass beads 38, which, upon tilting of the casing 11, are movable from one end of each of the formed tubes to the other end thereof at the will of the user of the instrument. That is to say, the beads 38 in both tubular structures 26 and 27 can be moved so as to be entirely disposed in the metal sections 31 of the structures 26 and 27, and thereafter, by tilting the casing 11 to a position the reverse of its former position, the beads 38 can be moved in both tubular structures 26 and 27 entirely into the sections 34 thereof made of plastic or other electrically non-conductive material.

Thus, by moving the beads into metal sections 31 of the tubular structures, which are conductively connected to electrode 18 of the electrometer disposed in the hermetically sealed casing 11, an electrostatic charge is produced or the electrometer 14 is charged in a manner more fully described hereinafter and the pointer 22 thereof is deflected against or in relation to a calibrated scale, hereinafter described. Withdrawal of the beads 38 from sections 31 into sections 34 of tubular structures 26 and 27 to break the contact with the electrode 18 of the electrometer places the electrometer 14 in condition for discharging and the quickness of the return movement of the pointer 22 to its initial position furnishes an indication of the conductivity of the enclosed air, especially its ionization such as in the instance of the passing of radioactive radiations through the casing. In lieu of the tubular structures 26 and 27, this invention contemplates the provision of a casing 11 consisting, if desired, of an upper shell 12 and a lower shell 13 each centrally divided transversely into a section fabricated from an electrically conductive material, such as metal, and a section fabricated from an electrically non-conducted material, such as plastic, with the two shells welded together at the juncture or meeting edges, each shell being formed adjacent to its sides with cavities of semi-circular shape to afford, when the shells are secured together, tubular passages formed within or by the material of the casing per se in which the beads 38, or similar insulation particles, are loosely disposed, all with equivalent operative results, and the conductivity of the ambient air, especially its ionization with radioactive activity, is indicated by the rate of return movement of the pointer 22 to its initial position.

In accordance with the present invention, I also provide, in the preferred embodiment of the present invention shown in Fig. 1, means for temporarily and automatically short-circuiting the electrometer 14 through the outer annular electrode 18 which it contacts as well as the pointer 22, this action taking place at the same time that the beads 38 are moved into sections 31 of the tubular structures 26 and 27, and before the separation or withdrawal of the body of mass of insulating material, i. e., the beads 38, from the metal section 31. In this manner the potential of the beads or pellets 38 is impressed upon both electrodes 18, 22 of the meter 14 and the pointer 22 assumes an inital or zero position. As a result, the difference of potential produced in the electrometer 14 after the breaking of the short circuit is independent of external potentials, notably from the earth potential, inasmuch as any residual potential difference between the electrodes of the electrometer is canceled by this short-circuiting. Accordingly, the short-circuiting of the electrodes of the electrometer, as stated, obviates the possibility that any residual charges remaining on the electrodes from previous measurements could affect the result of new and successive measurements. The aforementioned means preferably comprise a loosely mounted drop-pin 41 which is confined normally in a recess 42 formed in a metal housing 43. The housing 43 conveniently is fastened within casing 11 by means of bridge pieces or members 44 and 46 which are made of electrical insulation material and which are secured by means of screws 47 between the plastic sections 34 of the tubular structures 26 and 27. The metal housing 43 serves as a mount or support for an upright 48 upon the outer extremity of which the pointer 22 is pivotally mounted. Since the drop-pin 41 is loosely mounted in recess 42 of housing 43, the drop-pin will recede from contact with the outer, annular electrode of the electrometer and thus annul the short-circuiting thereof when the instrument is tilted back to its former position whereby the beads 38 move out of sections 31 and into sections 34 of the tubes 26 and 27; it being noted that the pointer electrode 22 of the electrometer will retain the potential received during the short-circuiting position of the drop-pin 41. As soon as the instrument is tilted back to withdraw the beads 38 from their charging position there will occur a displacement of the charge and the potential of the outer electrode 18, in contact with the metal section 31 from which the beads 38 have been withdrawn, will change. Thus the pointer 22 will assume a position different from its initial or zero position which it occupied upon the movement of the beads 38 into the sections 31 of the tubes 26 and 27. A window 49 is conveniently provided in the upper shell 12 of casing 11 to enable observation of the movements of the pointer 22.

As illustrated in Fig. 1, the preferred embodiment of my invention also includes an hour-glass 51 of predetermined capacity, the action of which can be observed through a window, provided in the upper shell 12 of the casing 11. The disposition of the hour-glass 51 in casing 11 is such that when the electrical insulation material within the tubes 26 and 27 is moved to charging positions within metal sections 31 of such tubes, the sand in the hour-glass runs into receptacle 52 of the hour-glass whereas withdrawal of the beads 38 from their charging positions, by reverse tilting of the instrument, causes the sand to run into the cup 53 of the hour-glass. The hourglass 51 can be so calculated as to capacity and time of transfer of the sand from receptacle 52 to the cup 53 thereof that it runs down within a time interval during which the electrometer 14 discharges itself when the radioactive radiation in the ionized air within casing 11 reaches injurious concentration. Observation of the hour-glass action, and of the position occupied by its pointer 22 at the end of the time interval measured by the hour-glass, provides means of ascertaining whether the pointer 22 remains deflected as long as, in the absence of ionizing effects, should be the case.

As shown in Fig. 1, a calibrated scale 56 is delineated on the window 49 of the upper shell 12 overlying the area bounded by segments 19 and 21 of the outer annular electrode 18 of the electroscope. The position of the pointer 22 at the end of the measured time interval can be read through window 49 in relation to the scale 56 thereon and furnishes an indication of the intensity of radiation present.

In Fig. 2 of the annexed drawing, I have illustrated a modified embodiment of the invention which comprises an outer transparent casing 111 fabricated from electrical insulation material, and an inner transparent casing 112 likewise fabricated from an electrical insulation material and supported in fixed relationship to and within casing 111 conveniently by means of a series of spacer bodies 113; the latter being secured to both the inner and outer casings by suitable fastening means, such as by welding.

In accordance with the invention, the inner casing 112 of my modified embodiment of the invention is supported in spaced relationship from the top and bottom of the outer casing 111, and the casing 112 is so formed as to provide a cutout area 115 which conveniently serves as a medium for mounting an extruded housing of electrical insulation material defining a chamber 114 which is capped by a metal closure 116. The chamber 114 constitutes a receptacle for a plurality of loosely disposed particles of electrical insulation material, such as glass beads 118, which are readily movable as a mass, upon tilting of the instrument, from the chamber 114 to within the metal closure 116 of the housing; the reverse tilting of the instrument to a diametrically opposite position effecting the withdrawal of the beads 118 from the metal closure 116 and the return thereof to within the chamber 114. As shown, the metal closure 116 is formed with a recess 119 therein which serves for the reception of a drop-pin 120, and a metal upright 121 projects from the metal closure 116 to serve as a support for an electrometer pointer 122 which is pivoted on pin 123 extending through the upright. As in the case of the preferred embodiment of Fig. 1 the pointer 122 is a two-armed indicator needle with the extremities of the arms thereof shaped like pole pieces.

In addition to the foregoing elements, the inner casing 112 of the modification of Fig. 2 is provided with an electrometer, generally designated by the reference numeral 124, having an inner electrode, not shown, and an outer annular electrode 126. Contrary to the exemplification of Fig. 1, the outer annular electrode of electrometer 124 is formed in the modification of Fig. 2 by layers 127 and 128 imprinted with electrically conductive material upon circular segments 129 and 130 of the inner case 112; the layers 127 and 128 being conductively connected together and eccentrically shaped, as shown. The layer of electrically conductive material comprising the outer annular electrode 126 of the electrometer is continued around the circular segment 130 of casing 112 to such extent that the layer is in the path of the drop-pin 120 and contacted thereby when the instrument is tilted, or inverted, to a position which is the reverse of its position as illustrated in Fig. 2.

The outer casing 111 of the modification of Fig. 2 conveniently is formed with a window 131 therein at the area thereof overlying the electrometer 124 supported in casing 112; the entire swing or movement of the pointer 122 can be viewed through the window against and in relation to the calibrated scale 132 delineated upon the window 131 in the same manner as in the preferred embodiment of Fig. 1.

The use of the exemplification of Fig. 2 is substantially the same as that of Fig. 1 in that by tilting the instrument the body of insulation material in chamber 114, i. e., the beads 118, are moved into the metal closure 116 for charging the electrometer 124; contact being effected to the outer annular electrode 126 thereof through the upper metal upright 121 extending from the metal closure 116 and on which the pointer 122 is pivotally mounted. At the time that such transfer of the beads 118 is made to their position of charging the electrometer, the drop-pin 120 moves into contact with the conductive layer 128 on segment 130 of the case 112 forming a segment of the outer annular electrode 126 to short-circuit the electrometer 124, and the drop-pin moves in unison with the movement of the beads 118. Any residual charge of the electrometer, as reflected by some off-normal position of the pointer 122, is dissipated by the short-circuiting of its electrodes and, thus, the pointer 122 assumes its zero position prior to being again deflected by the charge of the beads 118 when the instrument is righted. In the absence of ionized air within the casing 111, the deflected pointer 122 will drop back to zero or its initial position at a predetermined rate, but should radioactive radiation pass through the instrument to ionize the enclosed air, the pointer 122 will make its return to zero or its initial position at a different rate clearly observable through window 131 of the casing 111 as against the calibrated scale 132. The quickness of the return movement of the pointer 122, as most conveniently measured by the final position of the pointer after a predetermined time interval, gives an indication of the ionization of the enclosed air and a measure of the intensity of the radiations passing through the casing or instrument.

As hereinabove indicated, the casings 111 and 112 of the modification of Fig. 2 are fabricated from electrical insulation material, preferably from a transparent plastic including the material sold commercially and known as "Plexiglas." For durability in inclement weather, the entire outer casing 111, except for window areas, such as the window 131 at the area of the scale 132 overlying the electrometer 124, can be covered with an opaque lacquer.

The hereindescribed instruments are especially useful for testing the ionizing effects of ambient space, for example in estimating the concentration of radioactive radiations, whether gamma, alpha or beta rays all of which with their strong ionizing effects make themselves felt in the discharging of the electrometers 14 and 124 of both modifications. The embodiments of the present invention are extremely reliable and efficacious in highly critical moments, for example, shortly after the detonation of an atom bomb. Moreover, their simplicity of manipulation enhances their value since even children or panic-stricken adults are insured against erroneous readings by reason of the fact tha the instruments afford automatic short-circuiting of the electroscope or electrometer, thus obviating the possibility of residual charges remaining from previous measurements which otherwise would affect results of new and successive measurements. As described hereinabove, moreover, the instruments of my present invention permit measurements to be repeated at shortest intervals.

It is to be understood that the appended claims are to be accorded a range of equivalents commensurate in scope with the advance made over the prior art.

I claim:

1. In an ionization-responsive instrument, in combination, an indicating device having a pair of electrodes separated by an ionizable medium, said device including means for indicating a charge present in said electrodes, a charge generator conductively connected to one of said electrodes, said generator being adapted to assume two different positions and to apply a respective one of two different potentials to said one electrode in each of said positions, and short-circuiting means coupled with said generator and conductively interconnecting said two electrodes in one but not in the other of said positions, whereby the difference between said two potentials will be developed across said electrodes upon return of said generator from said one to said other position.

2. The combination according to claim 1 wherein said instrument comprises a shell containing said electrodes and said charge generator, said generator being fixedly mounted within said shell for movement into said different positions by a tilting of said shell.

3. The combination according to claim 2 wherein said short-circuiting means comprises a metallic holder, fixedly mounted in said shell and permanently connected to one of said electrodes, and a contact member displacedly secured to said holder for conductive engagement of the other of said electrodes in a first position of said shell while being separated from said other electrode in a second position of said shell.

4. The combination according to claim 2 wherein said shell is provided with a transparent portion, said charge-indicating means being positioned inside said shell and visible through said transparent portion.

5. The combination according to claim 4 wherein said charge-indicating means includes a movable portion of one of said electrodes.

6. The combination according to claim 2, including timer means within said shell for ascertaining the rate of discharge of said electrodes, said shell being provided with a transparent portion enabling reading of said timer means.

7. The combination according to claim 6 wherein said timer means is mechanically coupled with said generator for actuation of said timer means upon return of said generator from said one to said other position.

8. The combination according to claim 2 wherein said shell is provided with an internal projection of insulating material, one of said electrodes comprising a conductive coating on said projection.

9. The combination according to claim 8 wherein the electrode comprising said conductive coating is substantially annular, the other of said electrodes comprising a pointer pivotally mounted at the center of said annular electrode.

10. The combination according to claim 1 wherein said electrodes comprise, respectively, a substanaially annular electrode and a pointer having a pivot at the center of said annular electrode and having two arms extending symmetrically on opposite sides of said pivot, said annular electrode comprising two segments co-operating with respective ones of said arms and eccentric but centrally symmetric with respect to said pivot.

11. The combination according to claim 1 wherein said generator comprises a housing having an electrically conductive section and a dielectric section, and dielectric charge-carrying means in said housing occupying said conductive section and said dielectric section in said one and said other generator position, respectively.

12. The combination according to claim 11 wherein said charge-carrying means comprises a plurality of pellets of dielectric material loosely held in said housing.

13. An ionization-responsive instrument, comprising an indicating device having electrodes positioned in an ionizable medium and means for indicating a charge present on said electrodes, and a charge generator adapted to supply a charge of substantially invariable magnitude to at least one of said electrodes, said generator comprising a housing having an electrically conductive section and a dielectric section, said conductive section being connected to one of said electrodes, and dielectric charge-carrying means in said housing displaceable between said conductive section and said dielectric section.

14. An instrument according to claim 13 wherein said charge-carrying means comprises a plurality of pellets of dielectric material loosely held in said housing.

15. An ionization-responsive instrument, comprising an indicating device including a first electrode and a second electrode positioned in an ionizable medium, said first electrode being adapted to occupy different positions relative to said second electrode in response to changes in the relative potential of said electrodes, and a charge generator adapted to impress a predetermined potential upon at least one of said electrodes, said generator comprising a housing having an electrically conductive section and a dielectric section, said conductive section being connected to one of said electrodes, and dielectric charge-carrying means in said housing displaceable between said conductive section and said dielectric section.

16. An instrument according to claim 15, including short-circuiting means coupled with said generator and conductively bridging said electrodes in a first position of said generator but leaving said electrodes insulated from each other in a second position of said generator, said charge-carrying means being in contact with said conductive section in one of said positions but being separated from said conductive section by said dielectric section in the other of said positions.

17. An ionization-responsive instrument, comprising a base of insulating material, an indicating device having electrodes mounted on said base in an ionizable medium and means for indicating a charge present on said electrodes, and a charge generator on said base adapted to supply a charge of substantially invariable magnitude to at least one of said electrodes, said generator comprising a housing having an electrically conductive section and a dielectric section, said conductive section being connected to one of said electrodes, and dielectic charge-carrying means in said housing adapted to be displaced between said conductive section and said dielectric section by a tilting of said base.

18. An instrument according to claim 17 wherein said conductive section forms a top portion of said housing and said dielectric section forms a lower portion of said housing, whereby said charge-carrying means will normally be separated from said conductive section by said dielectric section but will make contact with said conductive section upon an inversion of said base.

19. An instrument according to claim 18, including a conductive member carried on said base and adapted to short-circuit said electrodes upon inversion of said base.

20. An instrument according to claim 18, including an hour-glass carried on said base and adapted to start measuring a predetermined time interval upon righting of said base following an inversion thereof.

RUDOLF FUTTERKNECHT.

References Cited in the file of this patent

UNITED STATES PATENTS

| Number | Name | Date |
|---|---|---|
| 1,855,669 | Glasser et al. | Apr. 26, 1932 |
| 2,459,555 | Tossas | Jan. 18, 1949 |

FOREIGN PATENTS

| Number | Country | Date |
|---|---|---|
| 395,067 | France | Dec. 17, 1908 |